(No Model.)

A. ROGERS.
Car Wheel.

No. 238,717. Patented March 8, 1881.

Witnesses:

Inventor:
A. Rogers
per
J. W. Alexander
Attorney.

UNITED STATES PATENT OFFICE.

ARTHUR ROGERS, OF BARNESVILLE, OHIO.

CAR-WHEEL.

SPECIFICATION forming part of Letters Patent No. 238,717, dated March 8, 1881.

Application filed January 21, 1881. (No model.)

*To all whom it may concern:*

Be it known that I, ARTHUR ROGERS, of Barnesville, in the county of Belmont and State of Ohio, have invented certain new and useful Improvements in Car-Wheels; and I do hereby declare that the following is a full, clear, and exact description thereof, reference being had to the accompanying drawings, and to the letters of reference marked thereon, which form part of this specification, and in which—

Figure 1:
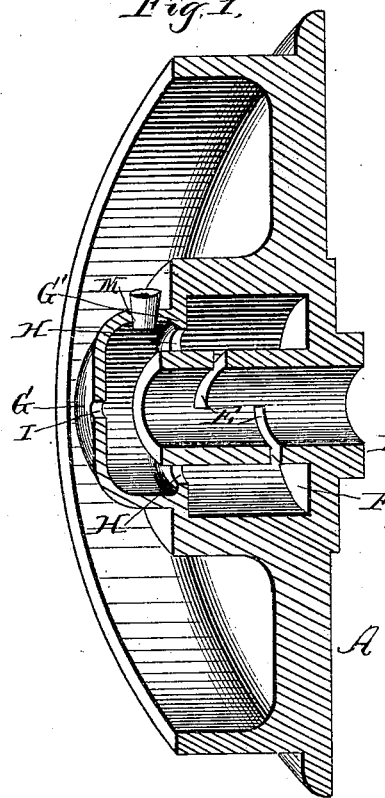
Figure 2:
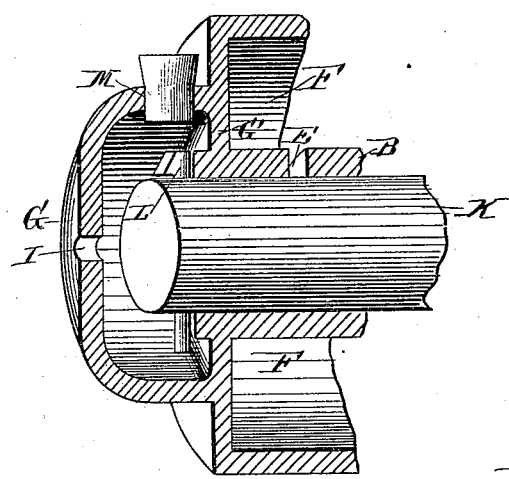

Figure 1 is a sectional perspective view of my wheel, and Fig. 2 is a similar enlarged view of a part of the same.

My present invention relates to that class of car-wheels in which the oil for lubricating the axle is introduced into a cap bolted upon the face of the wheel, and from which cap the oil passes into an annular oil-chamber within the wheel, and thence to the axle through an opening in the hub.

My improvement consists, essentially, in forming two parallel slots through the hub, each of said slots extending half-way round the same.

A indicates the usual car-wheel, and B the hub, which is cast solid with the wheel. The hub is provided with two parallel slots, E E, each of which extends half-way round the hub. These slots are so arranged as to be on opposite sides of the hub, so that an even distribution of the oil upon the axle is insured, and also the hub not materially weakened.

F indicates the annular oil-chamber within the wheel, this chamber being around the hub, so that a supply of oil introduced into said chamber will flow through the slots to the axle.

The hub-cap G, instead of being cast separate from the wheel, as heretofore, is cast solid with the face thereof. The inner or flanged portion, G', of this cap is provided with oil-passages H H, through which the oil introduced into the cap will find its way into the oil-chamber, and the said cap is formed with a central opening, I, through which the oil is poured. The outer end of the hub is cast solid with the hub-cap, and the axle K is passed through the hub and into the cap, which is made sufficiently deep to receive a certain portion of the axle end.

The linchpin L is fitted into a hole formed through the end of the axle which is within the cap, and in order to admit of the insertion of said linchpin, and also of its withdrawal from the axle when required, the cap is made with a side hole, M, sufficiently large to admit of the ready passage of the pin. After the linchpin has been inserted in place this hole can be stopped by any suitable cap or plug—as, for instance, by a cork—so as to exclude dust. The particular form of the cap is immaterial—that is to say, it can be made semi-spherical, angular, or cone-shaped, and an annular flange can, if desired, be cast around the hole at the center or point of the cap.

It is obvious that more than two slots might be employed for the passage of oil from the oil-chamber to the axle, although I regard two slots as sufficient.

Having thus described my invention, what I claim, and desire to secure by Letters Patent, is—

1. The combination, with a car-wheel having an annular oil-chamber surrounding the hub, of the hub formed with two parallel slots, each extending half-way round the same, whereby the oil from the oil-chamber is evenly distributed upon the axle within the hub, substantially as specified.

2. The combination, with a car-wheel having an annular oil-chamber surrounding the hub, of the hub-cap cast with the face of the wheel and provided with passages leading to the oil-chamber, and the hub formed with two parallel slots, each extending half-way round the same, substantially as set forth.

In testimony that I claim the foregoing as my own I affix my signature in presence of two witnesses.

ARTHUR ROGERS.

Witnesses:
ALONZO HICKS,
JOHN M. GARDNER.